United States Patent [19]

Kettner et al.

[11] Patent Number: 4,552,746

[45] Date of Patent: Nov. 12, 1985

[54] PROCESS FOR THE REDUCTION OF THE SULFUR CONTENT IN A GASEOUS STREAM

[76] Inventors: Roland Kettner, Lehmweg 12, 2081 Heist; Norbert Liermann, Am Lerchenberg 17, 3103 Bergen 2; Torsten Lübcke, Otternweg 2, 3101 Hambühren II, all of Fed. Rep. of Germany

[21] Appl. No.: 435,832

[22] Filed: Oct. 21, 1982

[30] Foreign Application Priority Data

Nov. 2, 1981 [DE] Fed. Rep. of Germany ....... 3143400

[51] Int. Cl.$^4$ ............................................. C01B 17/02
[52] U.S. Cl. ............423/573 G, 423/567R, 423/573R, 423/574R, 423/244
[58] Field of Search .......... 423/242 A, 242 R, 244 A, 423/244 R, 567 R, 570, 573 G, 574 G, 564, 574 R, 537 R

[56] References Cited

U.S. PATENT DOCUMENTS

| | | | |
|---|---|---|---|
| 4,141,962 | 2/1979 | Dupuy et al. | 423/571 |
| 4,146,580 | 3/1979 | Beavor | 423/564 |
| 4,399,112 | 8/1983 | Voirin | 423/564 |
| 4,479,928 | 10/1984 | Voirin | 423/567 R X |

FOREIGN PATENT DOCUMENTS

| | | | |
|---|---|---|---|
| 2644617 | 6/1978 | Fed. Rep. of Germany . | |
| 2754595 | 6/1978 | Fed. Rep. of Germany . | |
| 38741 | 10/1981 | European Pat. Off. . | |
| 60742 | 9/1982 | European Pat. Off. . | |
| 25976 | of 1907 | United Kingdom . | |
| 1437143 | 5/1976 | United Kingdom | 423/574 R |
| 856974 | 8/1981 | U.S.S.R. | 423/573 G |

OTHER PUBLICATIONS

"Catalytic Oxidation of Hydrogen Sulfide. Influence of Pore Structure and Chemical Composition of Various Porous Substances" by Steijns and Mars, Ind. Eng Chem., Prod. Res. Dev., vol. 16, No. 1, 1977 (pp. 35-41).
European Search Report dated Jan. 19, 1984 in Application No. 82305783.1.

*Primary Examiner*—Gregory A. Heller
*Attorney, Agent, or Firm*—Alexander J. McKillop; Michael G. Gilman; Charles J. Speciale

[57] ABSTRACT

A process for the reduction of sulfur content in gas streams with production of elemental sulfur wherein the sulfur-containing gas is thermally treated, in the presence of oxygen, with a catalyst consisting essentially of titanium oxide.

12 Claims, 2 Drawing Figures

PROCESS FOR THE REDUCTION OF THE SULFUR CONTENT IN A GASEOUS STREAM

FIELD OF THE INVENTION

The present invention relates to a process for the selective reduction of the sulfur content in a gaseous stream. More particularly, the present invention relates to a process for the reduction of sulfur content in a gaseous stream, with the production of elemental sulfur, by hydrogenation or hydrolysis of all sulfur components into hydrogen sulfide and selective oxidation of the hydrogen sulfide with oxygen to form elemental sulfur.

BACKGROUND OF THE INVENTION

The removal of sulfur components, particularly hydrogen sulfide, from gaseous streams such as the waste gases liberated in the course of various chemical and industrial processes, for example, in the pulping of wood, in the production of natural gas and crude oil and in petroleum refining, has become increasingly important in combating atmospheric pollution. Gases containing sulfurs, particularly hydrogen sulfide, not only have an offensive odor, but such gases may also cause damage to vegetation, painted surfaces, and wild life as well as constitute a significant health hazard to humans. Government wide regulations have increasingly imposed continuously lower tolerances on the sulfur content of gases which can be vented to the atmosphere, and it is now imperative in many localities to remove virtually all the sulfurs, particularly hydrogen sulfide, under the penalty of an absolute ban on continuing operation of a plant or the like which produces the sulfur-containing gaseous stream.

In the majority of cases, sulfurs in a gaseous stream are substantially converted to hydrogen sulfide by well known means prior to subjecting the gaseous stream to treatment to remove the sulfur components therein. One well known process for the removal of hydrogen sulfide from gaseous streams is known as the Claus process. According to the Claus process, elemental sulfur is produced from hydrogen sulfide by (a) partially oxidizing the hydrogen sulfide in the gas stream to sulfur dioxide by means of atmospheric oxygen and (b) subsequently reacting the sulfur dioxide formed with the remaining portion of the hydrogen sulfide in the presence of a catalyst. The Claus system comprises a combustion chamber in which, at temperatures from 950° to 1350° C., about 50 to 70% of the sulfur contained in the feed gas is converted into elemental sulfur. The sulfur is condensed out by cooling the reaction gas to a temperature below the dew point of sulfur. After the separation of the sulfur, the remaining gases are heated to a temperature above the dew point of sulfur and the treatment is repeated to further remove sulfur components. Normally, the gas passes through not less than two such Claus catalyst stages between which the reaction gas is cooled to a temperature below the sulfur dew point, the condensed sulfur is removed and the remaining gas is reheated before entering the next Claus catalyst bed.

The different stages of the process may be represented by the following equations:

$$H_2S + \tfrac{3}{2} O_2 \longrightarrow SO_2 + H_2O \tag{I}$$

$$2H_2S + SO_2 \rightleftharpoons 3S + 2H_2O \tag{II}$$

The overall reaction may be expressed by the following equation:

$$3H_2S + \tfrac{3}{2} O_2 \rightleftharpoons 3S + 3H_2O \tag{III}$$

Due to the given thermodynamic equilibrium and process conditions, the exhaust gas of the last catalytic process stage still contains small amounts of hydrogen sulfide, sulfur dioxide, carbon oxysulfide, carbon disulfide, and elemental sulfur in the form of vapor or mist. Such gas is subjected to an after combustion wherein the sulfur components are converted into sulfur dioxide which is then released into the atmosphere. Depending on the way in which the process is conducted, the sulfur emitted into the atmosphere with the exhaust gas is in the form of sulfur dioxide still amounts to about 2 to 6% of the sulfur contained in the feed gas in the form of hydrogen sulfide. In view of the air pollution and the loss of sulfur involved, further purification is imperative.

To reduce the emission of sulfur compounds from Claus systems, a number of special processes for after treatment have been developed and tested. Such after treatment is carried out either directly after the last catalytic process stage or before the post combustion, depending on the type of process. These additional after treatment installations are complicated and expensive in regard to apparatus and process technology due to the diversity of the sulfur compounds occuring in the Claus exhaust gas.

One group of processes, applied before the post-combustion, utilizes catalytic reaction, to achieve as complete a reaction process as possible between hydrogen sulfide and sulfur dioxide. With these processes, the reaction temperature is lowered to below the condensation point of sulfur, whereby the reaction equilibrium corresponding to equation II is shifted in the direction favoring the formation of sulfur. In this group, one distinguishes between dry processes using alternating reactors in which the catalyst is intermittently charged with sulfur and discharged, and processes wherein hydrogen sulfide and sulfur dioxide react in high-oiling catalyst-containing liquid, forming elemental sulfur, where the latter is drawn off continuously as a liquid product. These processes have disadvantages in that any deviation from the optimum hydrogen sulfide/sulfur dioxide ratio in the Claus exhaust gas results in reduced sulfur yield and that no appreciable conversion of sulfur compounds, such as carbon oxysulfide and carbon disulfide takes place.

With another group of processes, a gas containing hydrogen or carbon monoxide is utilized in the presence of water for the hydrogenation of the sulfur components into hydrogen sulfide. The hydrogen sulfide is further processed by either (a) absorptive scrubbing processes with regeneration wherein removed hydrogen sulfide is returned into the Claus system; or (b) oxidative scrubbing processes wherein removed hydrogen sulfide in the solution is directly converted into elemental sulfur. These processes do not require a stoichiometric hydrogen sulfide/sulfur dioxide ratio in the Claus exhaust. However, these processes require high expenditures for elaborate apparatus and have high energy requirements. The return of washed out hydrogen sulfide curtails the Claus capacity. Furthermore, some of the processes in this group produce waste water containing harmful constituents.

It is also known to increase the equilibrium conversion of the Claus reaction (equation II) by condensing out part of the water contained in the gas to be purified. The gas is subsequently heated to the temperature required for a Claus reactor and caused to react over a Claus catalyst to form elemental sulfur. A disadvantage in this connection is that this process produces waste water that is highly corrosive due to the formation of thiosulfuric acid, polythionic acids and sulfurous acid and any processing of such waste water requires high expenditure. Problems are also caused by the unavoidable formation of deposits of elemental sulfur during water condensation. There is no conversion of carbon oxysulfide and carbon disulfide with this process.

It is likewise known to proceed, after the mentioned conversion of all sulfur compounds into hydrogen sulfide, by oxidizing part of said hydrogen sulfide with air into sulfur dioxide or converting part of the sulfur produced into sulfur dioxide and further catalytically converting the remaining hydrogen sulfide with sulfur dioxide, at 125°–150° C. in fixed-Beol reactors, into sulfur and regenerating the loaded catalyst by passing through it hot oxygen-free gases containing hydrogen sulfide. Thereby, it is possible to avoid the disadvantages of the processes described in connection with the first group, such as dependence on hydrogen sulfide/sulfur dioxide ratio and carbon oxysulfide/carbon disulfide content in the Claus exhaust gas. Disadvantages include the increased apparatus expenditure required by the addition of the hydrogenation/hydrolysis stage and the higher hydrogen sulfide/sulfur dioxide input concentration for the low-temperature reactor caused by the admixture of the separately produced flow of sulfur dioxide.

Moreover, there are known processes for direct catalytic oxidation of hydrogen sulfide in gas mixtures with air or oxygen into elemental sulfur. These processes have several disadvantages. Partly, they are not sufficiently effective in the thermodynamically advantageous temperature range or the proposed catalysts quickly lose their activity. The conversion efficiency obtainable is poor, particularly with low sulfur concentrations on account of the unfavorable reaction kinetics at the low temperatures. Some of these processes lack sufficient selectivity for hydrogen sulfide oxidation so that, partly, other oxidizable compounds, such as hydrogen, carbon monoxide and hydrocarbons are oxidized as well. To avoid this, the hydrogen sulfide oxidation is also carried out at temperatures below the dew point of sulfur; accordingly, the catalyst is loaded with elemental sulfur and must periodically be regenerated.

Various proposed catalysts quickly lose their activity due to absorption of sulfur dioxide or sulfatization. In some of the processes, the catalyst remains sufficiently active for only 30 to 90 days. The proposed catalysts are bauxite, aluminosilicate zeolites, active carbon, active components in the form of the oxides or sulfides of tungsten, vanadium, chromium, iron, cobalt, nickel, copper, molybdenum, silver, and manganese on inactive porous carrier materials, as well as alkali metal sulfides and combinations of alkali metal oxides with alkaline earth metal oxides.

Thus, so far, no satisfactory process is available that permits the selective catalytic oxidation of hydrogen sulfide into elemental sulfur taking place entirely in the gas phase to be performed within the thermodynamically favorable temperature range, particularly the low temperature range, at a high reaction rate, particularly with a high degree of conversion, in long-term operation or continuous operation. For the solution of this problem, there is now proposed an economical process which does not show the disadvantages indicated hereinbefore.

SUMMARY

Figure 1:
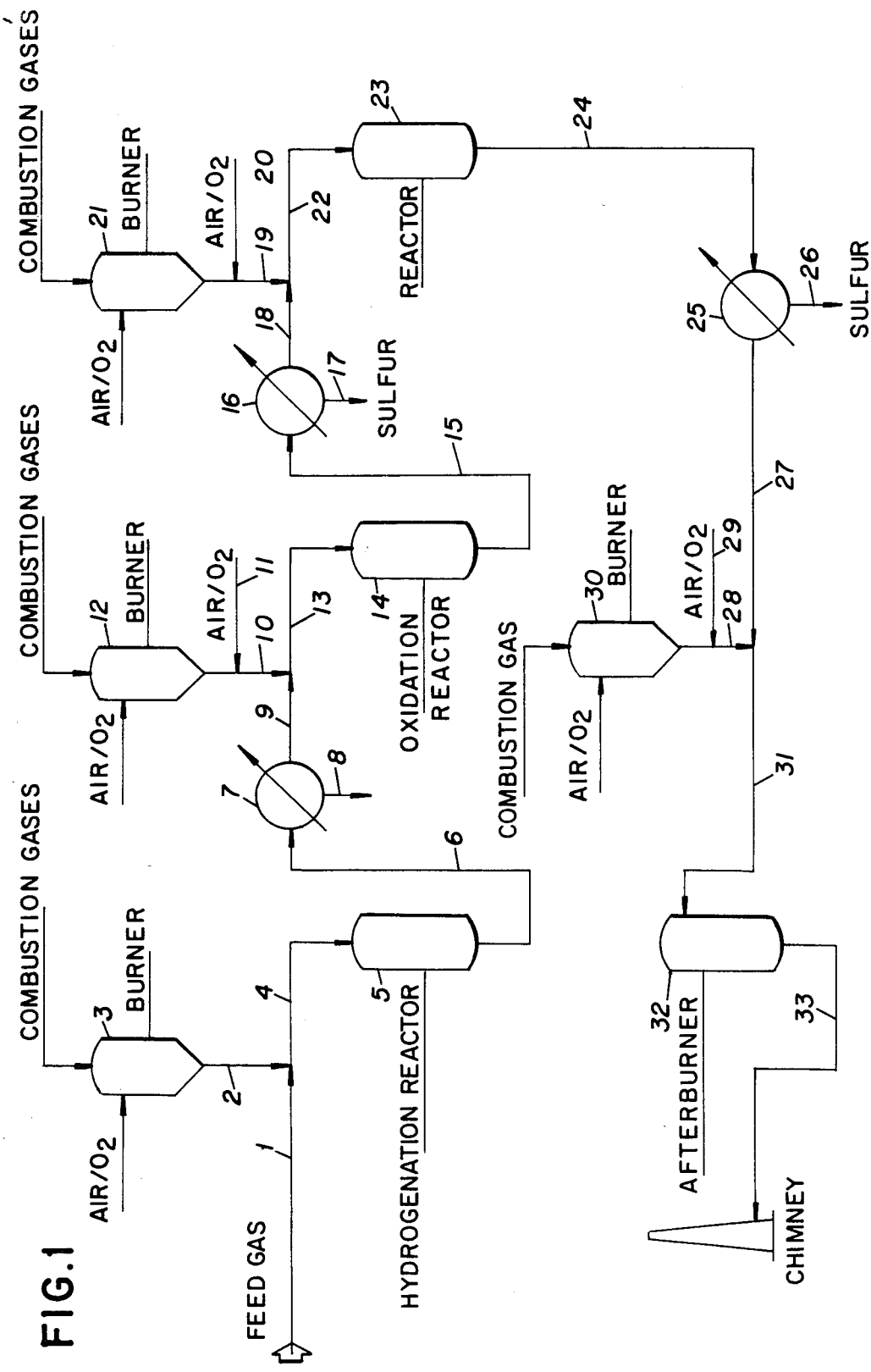
FIG. 1 shows a flow diagram of a preferred process according to the present invention.
Figure 2:
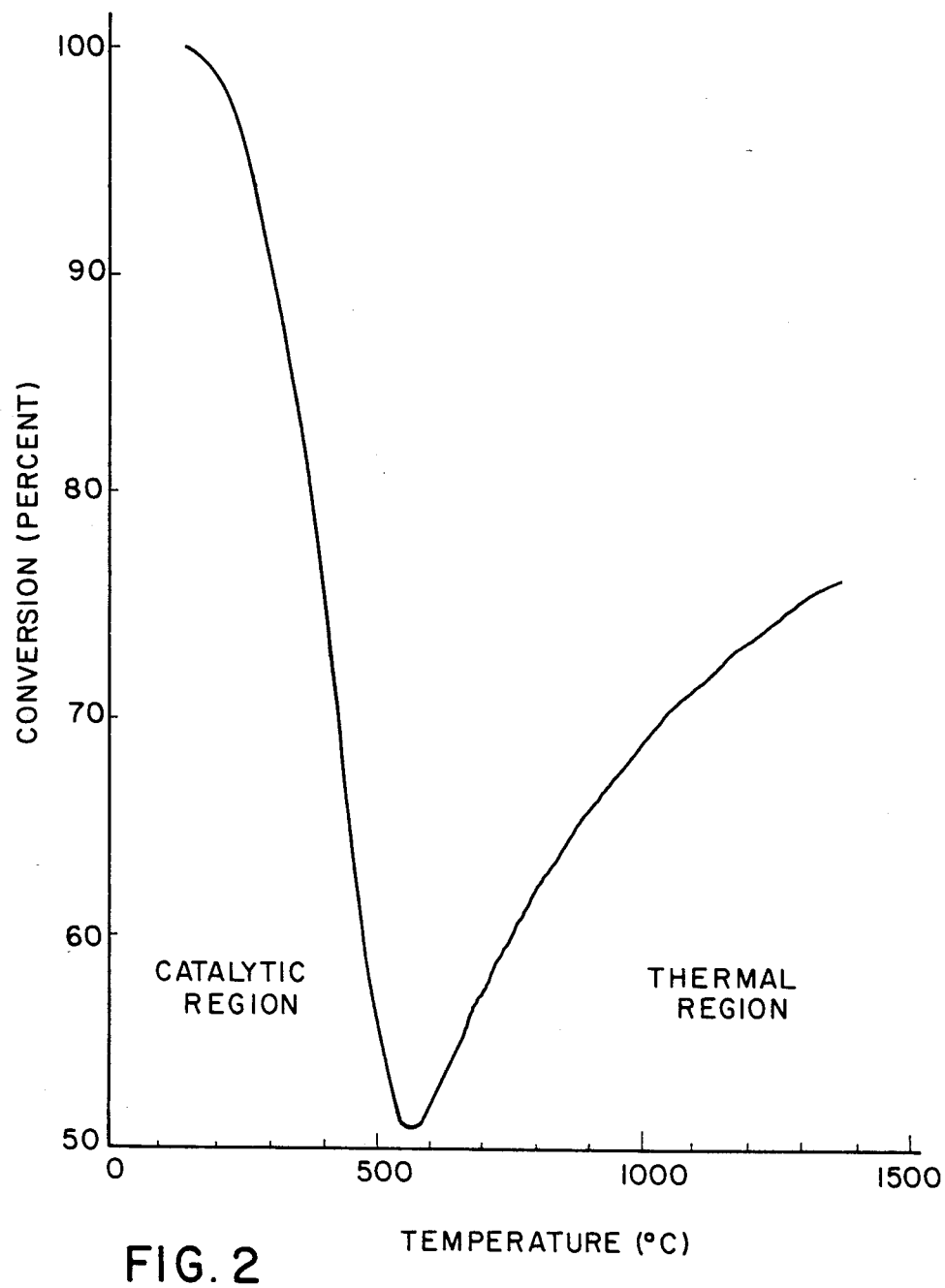
FIG. 2 shows the theoretical thermodynamic conversion of hydrogen sulfide into elemental sulfur through oxidation with air under water-free conditions as a function of the temperature whereby the lower (catalytic) and the higher (thermal) ranges can be recognized.

The present invention relates to a process for the reduction of sulfur content in gaseous streams, with the production of elemental sulfur, wherein the sulfur-containing gas is thermally treated in the presence of oxygen or air with a catalyst consisting essentially of titanium dioxide. The present invention is also applicable to the purification of a sulfur-containing gas stream wherein the gas stream has initially been treated, in accordance with known processes, to convert the sulfur components to hydrogen sulfide.

In one aspect, the present invention relates to a process for the reduction of sulfur content in a gaseous stream, with the production of elemental sulfur, wherein, if necessary, the gaseous stream is initially subjected to known treatments to convert the sulfur components to hydrogen sulfide. The gaseous stream, containing hydrogen sulfide with an approximately stoichiometrical amount of oxygen and a water content of less than 10% by volume, is thermally treated with a catalyst consisting substantially of titanium dioxide. The parameters of the present invention, particularly the temperature, are controlled such that no substantial separation of sulfur on the catalyst occurs.

DETAILED DESCRIPTION OF SPECIFIC EMBODIMENTS

The present invention makes it possible to convert all sulfur compounds contained in the feed gas, with production of elemental sulfur. It is economical in both operation and energy consumption and permits to obtain sulfur yields of 99.5% in long term operation even in the case of highly varying operation of the Claus system. The process according to the present invention requires less capital investment and utilities compared to the requirements of the processes known so far, with equally high sulfur yields. It can also be used for producing sulfur from gas streams having a hydrogen sulfide content that is too low for processing by the Claus process. These may also be gas streams consisting mainly of light, saturated hydrocarbons, hydrogen or carbon-monoxide, as these compounds are not oxidized under the conditions for selective oxidation of hydrogen sulfide into elemental sulfur. For carrying out the process according to the present invention, no apparatus and equipment other than such tried and proven in many sulfur production and exhaust gas purifying plants is required.

The process of the present invention results in the 70–95% conversion of hydrogen sulfide to elemental sulfur depending on the initial hydrogen sulfide content, temperature, transient time and oxygen content. Preferably, the conditions are selected in such a way that at least 80% of the hydrogen sulfide is converted to elemental sulfur.

The catalyst utilized in the present invention consists essentially of titanium dioxide ($TiO_2$) as the active component. The catalyst contains at least 80% by weight $TiO_2$, has a specific surface area of 80–150 $m^2/g$, and has a pore volume of 0.30–0.45 $cm^3/g$. In order to increase the mechanical strength, 5 to 20% by weight of alkaline earth sulfates may be added. The $TiO_2$ catalyst is of an entirely novel type for the production of sulfur from $H_2S$. It is equally well suited for the direction oxidation of $H_2S$ into elemental sulfur (equation III) and for use in Claus reactors (equation II). In contrast to other catalyst based on aluminum oxides ($Al_2O_3$), the catalyst of the present invention is not deactivated by the formation of sulfates. Furthermore, in contrast to other catalysts based on silicon oxides ($SiO_2$) or aluminosilicates, the catalyst of the present invention is completely stable in steam-containing gases at high temperatures. The $TiO_2$ catalyst can also be used without hesitation in the presence of excessive oxygen without requiring periodic regeneration.

According to the present invention, a sulfur-containing gaseous stream is, if necessary, initially treated in accordance with conventional methods to convert essentially all of the sulfur components to hydrogen sulfide. Sulfur components that may be present in the gaseous stream include but are not limited to $H_2S$, $SO_2$, $COS$, $CS_2$, $CH_3SH$, sulfur vapor or mist, or any combination thereof. For example, treatment of the sulfur-containing gas with hydrogen at temperatures from 250°–400° C., on catalysts containing metal oxides/sulfides of the IV and/or VIII group of the Periodic Table, would result in the conversion of the sulfur components in the gas stream to hydrogen sulfide. Thereafter, the gas, containing $H_2S$, is cooled down to a temperature wherein the removal of condensed water is allowed. The conversion efficiency obtainable in the subsequent oxidation of $H_2S$ to elemental sulfur is highly dependent on the water content. The efficiency is improved with reduced amounts of water in the gas stream. The water content in the gas stream should preferably be reduced to less than 10% by volume, most preferably to less than 4–6% by volume.

The gaseous stream, containing $H_2S$, is then mixed with an approximately stoichiometrical amount of air or oxygen based on the $H_2S$ present, heated to a temperature from about 160° C. to about 320° C. and introduced into an oxidation reactor. The oxidation reactor contains the $TiO_2$ catalyst which has a high activity for the conversion of hydrogen sulfide to elemental sulfur at thermodynamically favorable temperatures.

Depending on the $H_2S$ content in the feed gas and the required sulfur yield, the oxidation reactor may be followed by additional catalyst stages. The process of the present invention may be repeated for further purification of the sulfur-containing gaseous stream. Additionally, the present invention is particularly suitable for application prior to or after a Claus process. The $TiO_2$ catalyst of the present invention is additionally particularly suitable for utilization in Claus process.

As stated above, the process of the present invention results in 70–95% conversion $H_2S$ to elemental sulfur. Preferably, the parameters are controlled in such a way that at least 80% of the $H_2S$ is converted to elemental sulfur. Furthermore, undesirable side reactions such as those resulting in the formation of COS, $CS_2$ or $SO_3$, do not occur. Additional components in the gaseous stream, such as light saturated hydrocarbons particularly methane, hydrogen or carbon monoxide, are not oxidized.

The conversion of $H_2S$ to elemental sulfur occurs in the gas phase. Due to the high temperatures utilized, elemental sulfur is not precipitated or condensed from the gas stream until the latter leaves the oxidation reactor. Consequently, the deposition of elemental sulfur on the catalyst is prevented.

In accordance with one aspect of the present invention, the gas supplied to the oxidation reactor is mixed with air or oxygen so that an $H_2S/O_2$ ratio of from about 1.5 to 1 to about 2 to 1 is maintained. With a temperature between 200° C. and 270° C. and a transient time of 500–3000 $h^{-1}$, preferably 800–1500 $h^{-1}$, the exhaust gas, leaving the oxidation reactor, contains only hydrogen sulfide as non-converted sulfur component. Sulfur dioxide is only present in traces. The exhaust gas is cooled to remove the elemental sulfur. The resultant gas may still contain undesirable amounts of $H_2S$ and, accordingly, can be supplied to a second oxidation reactor in which additional elemental sulfur is formed with the same catalyst as in the first oxidation reactor. The second oxidation reactor is operated in the thermodynamically more favorable temperature range of 190°–240° C. preferably, an $H_2S/O_2$ ratio of 1 to 1 is used in the second oxidation reactor resulting in $H_2S/SO_2$ ratio in the exhaust gas of about 2 to 1 and permitting maximum conversion. The transient times in the second oxidation reactor correspond to those of the first oxidation step.

According to another aspect of the present invention utilizing only one oxidation reactor, the $H_2S/O_2$ ratio and temperature are controlled in such a manner that the exhaust gas has an $H_2S/SO_2$ ratio of 2 to 1. This exhaust gas, after condensation of the sulfur formed and after reheating, can be supplied to a Claus reactor operating at 170°–200° C. Additional sulfur is formed through the contact with the titanium dioxide catalyst of the invention according to equation II. Since the catalyst has also an excellent activity for the Claus reaction and cannot be deactivated by means for oxygen or sulfate, an optimum conversion is achieved in the long-term operation.

In accordance with still another aspect of the present invention, the oxidation reactor is operated in such a way that as high a conversion as possible of $H_2S$ into elemental sulfur is achieved. After condensation of the formed sulfur, the exhaust gas is subsequently supplied to a Claus reactor operating at 125°–150° C. in which an almost complete adsorption of the sulfur, contained in the vapor phase, on active aluminum oxide ($Al_2O_3$) takes place. Additional sulfur is still formed in the Claus reactor when there is an $H_2S/SO_2$ ratio of about 2 to 1. Given the low water content, still about 50% of the sulfur compounds are converted to elemental sulfur even with sulfatized catalysts. The preferred space velocities are in the range from 800 to 1500 $h^{-1}$. Because of the low sulfur content of the gas after the oxidation stage, an approximately 8 to 20 hours desorption phase per week is sufficient for the removal of sulfur. For this purpose, the exhaust gas of the oxidation stage is heated to 230°–270° C. before it enters the adsorption reactor. After sulfur condensation at 120°–135° C., the exhaust gas is subjected to post-combustion. The sulfur production efficiency of the Claus system and exhaust gas purification remains still above 99% even during this short time desorption operation.

The following examples of the process alternatives as essentially described above, serve as a further explanation of the invention.

EXAMPLE 1

A feed gas having the following composition is processed in a Claus system with two catalytic stages:
$H_2S$: 76% by volume
$CO_2$: 21% by volume
$CH_4$: 2.5% by volume
$N_2$: 0.5% by volume A sulfur yield of approximately 95% is achieved. Column 1 of the following Table I shows the composition of the Claus exhaust gas leaving the last sulfur condensor/separator which is operated at approximately 125° C. After the hydrogenation/hydrolysis of the exhaust gas at 290°–320° C., a gas mixture is obtained according to column 2 of Table I. The water is removed from this gas by cooling to 35° C. (column 3) and heating it to 200° C. before it enters the oxidation reactor. The gas volume is reduced by about 25% by this water separation. For this reason, the subsequent piping and apparatus may have correspondingly smaller dimensions, in comparison with other processes which are not equipped with water separation, which has an advantageous effect on the investment costs. Furthermore, considerably less energy is required for the necessary intermediate heating than in the case of exhaust gas stream containing water.

Since, after hydrogenation, practically only hydrogen sulfide is present as sulfur compound, the processing of the condensed water does not pose any problems in a conventional acid water stripper. The treated water can be used as cooling water or even as boiler feed water.

An approximately stoichiometric amount of air, relative to the amount of hydrogen sulfide, is supplied to the hydrogenated gas before it enters the oxidation reactor. In the present example, about 0.6 to 1 $m^3$ oxygen is added to each cubic meter of hydrogen sulfide gas. With an inlet temperature of about 200° C., the hydrogen sulfide is converted into sulfur at the titanium dioxide catalyst with a space velocity of about 1100 $h^{-1}$. The reactor temperature rises to about 280° C. due to the exothermic reaction. About 85% of the hydrogen sulfide is converted into sulfur. After sulfur condensation at 130° C., the exhaust gas has a composition according to column 4 of Table I. Relative to the hydrogen sulfide used as inlet gas in the Claus system, the sulfur yield amounts to 99.1%.

It goes without saying that the sulfur yield can still be increased by a higher sulfur production efficiency of the Claus system, a further reduction of the water content in the condensation stage, a lower space velocity or by the removal of heat from the catalyst bed. With the connection of another Claus reactor operating at the temperature of the gas flow leaving the sulfur condensor, ie. at 135° C., and a space velocity of 1100 $h^{-1}$, the sulfur yield can be further increased. Conventional active aluminum oxide serves as the catalyst. The reactor can be operated continuously for about one week before a desorption phase becomes necessary. Column 5 of Table I shows the composition of the exhaust gas after the adsorption phase in such a Claus system. The overall sulfur production efficiency amounts to 99.5% relative to the hydrogen sulfide used in the first Claus system.

As usual, the exhaust gas is subjected to an after combustion. Since besides hydrogen sulfide and traces of elemental sulfur, practically no other sulfur compounds, i.e. COS or $CS_2$, must be oxidized, catalytic post-combustion can be selected on a low temperature level (290°–300° C.) having a considerably lower energy consumption in comparison with a thermo post-combustion. For the sulfur desorption of the last Claus system, the adsorption reactor is operated once per week for approximately 12 hours with the exhaust gas, leaving the sulfur condensor following the previous oxidation stage in accordance with the present invention, heated to about 240° C.

TABLE I

|  | (1) | (2) | (3) | (4) | (5) |
|---|---|---|---|---|---|
| $H_2S$ %/volume | 0.70 | 1.18 | 1.56 | 0.15 | 0.083 |
| $SO_2$ %/volume | 0.35 | 0 | 0 | 0.073 | 0.043 |
| $S_{6-8}$ $g/m^3$(vn) | 1 | 0 | 0 | 0.7 | max. 0 |
| COS %/volume | 0.09 | 0.002 | 0.003 | 0.003 | 0.003 |
| $N_2$ + Ar %/volume | 59.5 | 61.1 | 80.7 | 80.8 | 80.9 |
| $CO_2$ %/volume | 8.4 | 9.0 | 11.9 | 11.5 | 11.5 |
| CO %/volume | 0.43 | 0.05 | 0.065 | 0.06 | 0.06 |
| $H_2$ %/volume | 1.4 | 1.07 | 1.41 | 1.33 | 1.33 |
| $H_2O$ %/volume | 29.0 | 27.6 | 4.4 | 6.1 | 6.15 |
| TOTAL S YIELD % | 95 | 95 | 95 | 99.1 | 99.5 |

EXAMPLE 2

In case of high hydrogen sulfide content in the gas or exhaust gas to be treated, it may be more appropriate to perform the process in two successively arranged oxidation stages, in each of which the titanium dioxide catalyst of the present invention is used, due to the highly exothermic reaction of the selective oxidation of hydrogen sulfide into elemental sulfur. Table II shows typical data in connection with such a case.

With a feed gas consisting, for example, of 2.5% by volume hydrogen sulfide and 5–6% by volume water (column 1, Table III), and with the application of an approximately stoichiometric amount of oxygen/air in the last oxidation state, an exhaust gas is obtained containing hydrogen sulfide as practically the only remaining non-converted sulfur compound. A conversion of at least 75% is obtainable in continuous operation with a space velocity of approximately 1250 $h^{-1}$ and temperatures between 200°–300° C. In this case also, lower space velocities or lower water contents can lead to still better conversion rates.

After sulfur condensation at approximately 130° C. and reheating, the gas (column 2) is supplied to a second oxidation reactor. The oxygen amount is adjusted in such a way that an $H_2S/SO_2$ ratio of approximately 2 to 1 is obtained in the reactor outlet. The reactor temperatures are between 200°–230° C. and the space velocity amounts again to about 1250 $h^{-1}$. Once more, 70% of the hydrogen sulfide which has not been converted after the first oxidation stage is oxidized to sulfur (column 3) the greater part of which is separated in a subsequently arranged condensor at 125° C. Relative to the case of the Claus system to which Example 1 refers, the result is a total sulfur production of 99.3%.

TABLE II

|  | (1) | (2) | (3) |
| --- | --- | --- | --- |
| $H_2S$ content %/volume | 2.5 | 0.65 | 0.10 |
| $SO_2$ content % volume | 0 | trace | 0.05 |
| added amount of $O_2$ $M^2/m^3H_2S$ | 0.5 | 1 | — |
| Reactor IN °C. | 200 | 200 | — |
| Reactor OUT °C. | 320 | 240 | 240 |
| Conversion rate of % $H_2S$ into S |  | 75 | 77 |

EXAMPLE 3

In order to increase the sulfur yield, the oxidation stage can also be operated in such a way that an exhaust gas is obtained with a low content of hydrogen sulfide and sulfur dioxide in the molar ratio of approximately 2 to 1 respectively, which gas is supplied to a Claus reactor after sulfur condensation at about 125° C. and reheating to about 180° C. The titanium dioxide catalyst according to the invention is used in the oxidation reactor as well as in the subsequent Claus reactor. Only the new catalyst opens up the possibility of obtaining a high Claus yield without deactivating the catalyst at thermodynamically favorable temperatures in the presence of free oxygen. This would not be possible with a conventional Claus catalyst based on aluminum oxides. Typical data which are obtainable in a practical continuous operation are given in Table III.

A conversion of hydrogen sulfide into elemental sulfur of about 80% is achieved with a feed gas with 2% by volume hydrogen sulfide and 5 to 6% by volume water (column 1) when applying a slightly higher than stoichiometric amount of oxygen at a space velocity of about 1250 h$^{-1}$ and a temperature of 200°–310° C. The exhaust gas still contains low amounts of hydrogen sulfide and sulfur dioxide at a ratio of approximately 2 to 1 (column 2). The exhaust gas of the oxidation stage is supplied to a Claus reactor after the sulfur condensation at 125° C. and reheating to 180° C.

It is possible to convert another 75% of the not yet converted sulfur compounds into elemental sulfur (colunn 3) in a continuous operation using the titanium dioxide catalyst. This elemental sulfur is, for the greater part, separated in a subsequent sulfur condensor at 125° C. The space velocity in the Claus reactor is also at about 1250 h$^{-1}$. Relative to the case of the Claus system to which Example 1 refers, the result is a total sulfur production of 99.5%

TABLE III

|  | (1) | (2) | (3) |
| --- | --- | --- | --- |
| $H_2S$ content %/volume | 2.0 | 0.28 | 0.07 |
| $SO_2$ content % volume | 0 | 0.14 | 0.035 |
| added amount of $O_2$ $M^3/m^3H_2S$ | 0.65–1 | — | — |
| Reactor IN °C. | 200 | 180 | — |
| Reactor OUT °C. | 310 | 190 | — |
| Conversion rate of % $H_2S$ into S |  | 80 | 75 |

The preferred processes according to the present invention are further illustrated utilizing the flow diagram in FIG. 1. The feed gases reach line 4 through line 1 and are mixed with the reducing gases from line 2. This gas mixture should have a temperature of 200°–400° C., preferably 280°–320° C. The reducing gases, preferably hydrogen and/or carbon monoxide, are produced by below stoichiometric combustion of suitable combustion gases in a burner 3. The burner is controlled in such a way that the developing steam and the reducing gases are available in sufficient amounts so as to convert substantially all of the sulfur in the feed gas from line 1 into hydrogen sulfide by hydrogenation or hydrolysis and to adjust the suitable temperature in line 4.

Subsequently, the gas reaches the hydrogenation reactor 5 which is filled with a presulfided cobalt and molybdenum catalyst. In this reactor, the sulfur compounds contained in the feed gases are almost completely converted into hydrogen sulfide. These gases reach a condensor 7 through line 6 in which they are cooled, preferably to 10°–50° C. The acid water which develops in this way is discharged through line 8. The cooling of the gases from line 6 can also be effected in a combination of waste heat boiler, as well as direct and indirect cooling. The cooled gas from line 9 with a steam dew point of 10° to 50° C. is mixed in line 13 with the amount of oxygen and/or air through lines 10 and 11 which is almost stoichiometrically necessary for the performance of the direct oxidation in the preferred $H_2S/O_2$ ratio of 1.5 to 2 before entering the reactor 14. The adjustment of the reaction temperature in the preferred range from 180°–300° C. is effected by means for a burner 12 which is operated with a suitble combustion gas and air or oxygen at a permanently adjusted ratio. The heating of the gases can, of course, be effected also in any other suitable way. These gases come into contact with the titanium dioxide catalyst in the oxidation reactor 14 preferably at space velocities of 800 to 1500 V/V/h and temperatures in the preferred range from 200° to 270° C. In this temperature range, direct conversion of hydrogen sulfide into elemental sulfur and steam of 80–95% are possible.

Within the condenser 16 which is operated preferably within a temperature range of 120°–140° C., the gas mixture releases the sulfur vapor it carries and the condensed sulfur leaves the condensor by way of line 17. After having passed through line 18, the gas mixture is heated again by the burner 21 or any other devices in such a way that temperatures from 190°–240° C. prevail in line 22. The air and/or oxygen added from line 20 through line 19 is adjusted to give an $H_2S/O_2$ ratio of approximately 1 to 1 in the gas mixture in line 22 in order to perform a second direct oxidation.

The second direct oxidation is also performed by means of titanium dioxide catalyst in reactor 23 at space velocities of 800–1500 V/V/h. The gas mixture containing elemental sulfuric vapor is supplied to the condenser 25 through line 24 where the condensor is preferably operated in a temperature range of from 120°–140° C. The condensed liquid sulfur is discharged through line 26.

The gas mixture reaches line 31 through line 27 wherein the gas temperature is raised by means of the burner 30 in order to perform a complete oxidation of the remaining sulfur components. A sufficient excess of oxygen is obtained through lines 28 and 29 for the performance of the oxidation in reactor 32. The exhaust gases from reactor 32 can be emitted to the atmosphere through line 33 and the smoke stack.

In a variation of the process of the invention, and with identical conditions as described above prevailing in line 13, the amount of oxygen or air from line 11 is adjusted in such a manner that an $H_2S/SO_2$ ratio of 2 to 1 is obtained in line 15, behind the oxidation reactor. As described, the elemental sulfur generated is condensed within condensor 16 and is discharged through line 17. After these gases have been reheated, either by means of a stoichiometrically operated burner 21 and/or indirect heater or heat exchanger without the supply of air and/or oxygen, the gas mixture is led through line 22 to the reactor 23 which is operated in a preferred temperature range from 180°-200° C. and provided with a titanium dioxide catalyst. Additional sulfur is produced in this reactor according to the Claus reaction. The preferred spaced velocities are at 800–1500 V/V/h. After the sulfur vapor has been condensed out in the condensor 25, preferably operated in a temperature range from 120°–140° C. and after the sulfur is removed through line 26, the process is carried out as has already been described.

With another variation of the process of the present invention, so much air and/or oxygen is added through line 11 that, with otherwise the same conditions as described above, an $H_2S/O_2$ ratio is obtained in line 13 with which a maximum conversion of hydrogen sulfide into elemental sulfur can be achieved in reactor 14. Subsequently, the gas containing sulfur vapor or mist is led through line 15 into the sulfur condensor 16 which is operated in a preferred temperature range from 130°–150° C. and the elemental sulfur is drained through line 17. The gas mixture reaches the reactor 23, through lines 18 and 22, which is operated in a preferred temperature range from 125°–150° C. This reactor is then filled with an active aluminum oxide catalyst by which an adsorption of sulfur takes place according to a Claus reaction. This reactor is, after it has been charged with sulfur, drained off the sulfur when necessary with the help of the stoichiometrically operated burner 21 which adjusts the temperature of the gas mixture in line 22 to a preferred temperature range from 230°–270° C. The sulfur condensor 25 is operated under the same conditions as above described. The feed gas may also be supplied to line 6 or line 9, depending on the gas composition and insofar as it contains merely hydrogen sulfide as the sulfur carrying component, or, respectively, that it is in addition water free.

What is claimed is:

1. A process for the reduction of sulfur content in a gaseous stream with the production of elemental sulfur, comprising the steps of:
   (a) treating the gaseous stream by at least one of hydrogenation and hydrolysis to convert substantially all of the sulfur components therein to hydrogen sulfide;
   (b) then reducing the water content of the gaseous stream to less than 10 volume percent;
   (c) introducing oxygen into the gaseous stream;
   (d) treating the gaseous stream in a first oxidation reactor, containing a catalyst comprising at least 80 percent by weight titanium dioxide, at a temperature of about 200° C. to 270° C. wherein substantial conversion of $H_2S$ to elemental sulfur occurs;
   (e) cooling the product gas to a temperature of 120°–140° C. to separate elemental sulfur by condensation;
   (f) introducing additional oxygen into the gaseous stream in substantially stoichiometric amounts based on the sulfur content; and
   (g) treating the gaseous stream in a second oxidation reactor, containing a catalyst comprising at least 80 percent by weight titanium dioxide, at a lower temperature than that utilized in the first oxidation reactor.

2. The process of claim 1 wherein the $H_2S/O_2$ ratio in th gaseous stream introduced into the first oxidation reactor is controlled such that the non-converted sulfurs in the product gas consist essentially of $H_2S$.

3. The process of claim 1 wherein the catalyst in the oxidation reactors comprises 5 to 20 percent by weight earth alkaline metal sulfates.

4. The process of claim 1 wherein the temperature of the second oxidation reactor is from about 190° C. to about 240° C.

5. The process of claim 1 wherein the $H_2S/O_2$ ratio in the gaseous stream introduced into the second oxidation reactor is controlled such that the non-converted sulfurs in the product gas consist essentially of $H_2S$ and $SO_2$ in the ratio of 2 to 1, respectively.

6. The process of claim 1 wherein the gaseous stream of step (d) is cooled down to a temperature of about 125° C. to 135° C.

7. The process of claim 1, wherein the water in the gaseous stream is reduced to about 4–6 volume percent in step (b).

8. The process of claim 1 wherein the gaseous stream is passed through the first reactor, containing the catalyst, at a space velocity of about 500 to 3000 $h^{-1}$ relative to the normal state.

9. The process of claim 8 wherein the space velocity is about 800 to 1500 $h^{-1}$.

10. The process of claim 1 wherein the catalyst has a specific surface area of 80–150 $m^2$ per gram and a total pore volume of approximately 0.30–0.45 $cm^3$ per gram.

11. The process of claim 1 wherein additional components in the gaseous stream, such as light saturated hydrocarbons, hydrogen, or carbon monoxide, are not oxidized.

12. The process of claim 1 wherein the gaseous stream contains as sulfur compounds $H_2S$, $SO_2$, COS, $CS_2$, $CH_3SH$, sulfur vapor or any combination thereof.

* * * * *